United States Patent
Ingistov

(10) Patent No.: US 6,398,518 B1
(45) Date of Patent: Jun. 4, 2002

(54) METHOD AND APPARATUS FOR INCREASING THE EFFICIENCY OF A MULTI-STAGE COMPRESSOR

(75) Inventor: Steve Ingistov, Los Angeles, CA (US)

(73) Assignee: Watson Cogeneration Company, Carson, CA (US)

( * ) Notice: Subject to any disclaimer, the term of this patent is extended or adjusted under 35 U.S.C. 154(b) by 0 days.

(21) Appl. No.: 09/537,848

(22) Filed: Mar. 29, 2000

(51) Int. Cl.⁷ .............. F04B 3/00; F04D 31/00; F04D 1/00; F01D 5/08

(52) U.S. Cl. .............. 417/244; 415/116; 415/117; 415/180

(58) Field of Search .............. 417/244; 415/116, 415/117, 180, 47

(56) References Cited

U.S. PATENT DOCUMENTS

| | | | |
|---|---|---|---|
| 4,196,020 A | * 4/1980 | Hornak et al. | 134/167 R |
| 4,431,371 A | * 2/1984 | Thomson | 415/116 |
| 5,406,988 A | * 4/1995 | Hopkins | 141/2 |
| 5,630,590 A | 5/1997 | Bouchard et al. | 415/170.1 |
| 5,930,990 A | * 8/1999 | Zachary et al. | 60/39.53 |
| 5,961,279 A | 10/1999 | Ingistov | 415/170.1 |
| 5,967,743 A | * 10/1999 | Meylan | 415/116 |
| 6,250,064 B1 | 6/2001 | Tomlinson | 60/39.05 |

FOREIGN PATENT DOCUMENTS

JP    1-147199    * 6/1989

OTHER PUBLICATIONS

"Gas Turbine Compressor Washing", Stalder Jun. 1998 pp.1–10, ASME 98 GT420.

* cited by examiner

Primary Examiner—Charles G. Freay
Assistant Examiner—Michael K. Gray
(74) Attorney, Agent, or Firm—F. Lindsey Scott; Ekkehard Schoettle

(57) ABSTRACT

A multi-stage compressor, including a system for the injection of a cooling liquid into at least a portion of the compressor stages to increase the efficiency of the multi-stage compressor by reducing the temperature of the compressed gas produced in the multi-stage compressor. A cleaning solution may also be injected through nozzles used for the injection of the cooling liquid.

14 Claims, 2 Drawing Sheets

METHOD AND APPARATUS FOR INCREASING THE EFFICIENCY OF A MULTI-STAGE COMPRESSOR

FIELD OF THE INVENTION

This invention relates to an improvement in the fabrication and operation of multi-stage compressors to achieve increased efficiency by cooling the compressed gas in at least a portion of the stages and by cleaning the rotors in at least a portion of the stages by the injection of cleaning chemicals via nozzles used for the injection of a cooling fluid into at least a portion of the stages.

FIELD OF THE INVENTION

In many industrial applications such as the use of turbines to generate electrical power and the like, it is necessary that large volumes of gas, such as air, be compressed to relatively high pressures. While various types of gases such as hydrogen, natural gas, and the like are frequently compressed, the present invention will be discussed primarily by reference to the compression of air, although it is also useful with other gases. Large quantities of air are typically compressed for use for the combustion of natural gas or the like to provide a gaseous steam for use in driving turbines to generate electricity.

When gases are compressed, it is well known that the temperature of the compressed gas increases as the pressure is increased. In some instances, when high pressures are desired, it has been necessary to use a first compressor followed by inter-stage cooling and subsequent compression in a second compressor to reach the desired compression levels within temperature limitations of the compressors. In some instances, more than two compression stages have been required.

The use of such inter cooler steps has not generally been considered feasible for multi-stage compressors, particularly axial compressors comprising a plurality of stages with each stage comprising a set of rotor blades and a set of stator blades which have been used to compress air for use in the generation of electricity. Axial compressors have been the preferred types of compressor for this application.

A further problem in maintaining the capacity of compressors used for such purposes has been the tendency of the compressor blades to foul. This results in a substantial loss of power in the compressor. Various techniques have been used in attempts to clean the blades and avoid the loss of power. Some such techniques are discussed in "Gas Turbine Compressor Washing State of the Art—Field Experiences," by Jean Pierre Stadler, The American Society of Mechanical Engineers, 98-GT-420, 1998. In this article various techniques have been discussed for cleaning deposits from the blades of compressors. It appears that the cleaning solutions were introduced via the air inlet to the compressors.

As a result of the large amount of air required for electrical power generation as well as the requirements for large volumes of other gases, a continuing search has been directed to the development of a method and a compressor design, which can more efficiently compress gases.

SUMMARY OF THE INVENTION

According to the present invention, increased efficiency in such compressors can be achieved by a method for increasing the efficiency of the compression in a multi-stage compressor by injecting a quantity of a finely-divided mist of a selected liquid into at least one stage of the compressor to reduce the temperature of a compressed gas in the at least one stage thereby permitting the compression at an increased efficiency.

The invention further comprises an improved multi-stage compressor which includes a plurality of nozzles positioned to inject a quantity of a finely-divided mist of a selected liquid into at least one stage of the compressor to reduce the temperature of a compressed gas stream in at least one stage thereby enabling more efficient compression of the compressed gas and a reduction in the compressor power requirement.

The invention further comprises a multi-stage gas compressor comprising: an outer housing having an inside and an outside, an inlet and an outlet and supporting on its inner surface a plurality of rows of stator blades arranged around the inside of the outer housing; a rotor rotatably positioned inside the outer housing, having an outside, a first end near the inlet of the outer housing and a second end near the outlet of the outer housing and a plurality of rows of rotor blades arranged around the outside of the rotor with at least a portion of the rows of rotor blades being between the rows of stator blades, each row of the rotor blades with a succeeding row of stator blades forming a single compressor stage; and, at least one mist injection nozzle positioned to inject a selected quantity of a finely-divided mist of a selected liquid into the compressor between at least one pair of the stator blades in at least one of the rows of stator blades in at least one stage to enable more efficient compression of a compressed gas.

The invention further comprises a method for increasing the compressor efficiency in a multi-stage gas compressor comprising: an outer housing having an inside and an outside, an inlet and an outlet and supporting on its inner surface a plurality of rows of stator blades arranged around the inside of the outer housing; a rotor rotatably positioned inside the outer housing, having an outside, a first end near the inlet of the outer housing and an outlet near the outlet of the outer housing and a plurality of rows of rotor blades arranged around the outside of the rotor, each row of rotor blades taken with a succeeding row of stator blades forming a single compressor stage; and, at least one mist injection nozzle positioned to inject a selected quantity of a finely-divided mist of a selected liquid into the compressor between at least one pair of the stator blades in at least one of the rows of stator blades.

DESCRIPTION OF PREFERRED EMBODIMENTS

In the discussion of the Figures, the same numbers will be used throughout to refer to the same or similar components. Further details of the construction and operation of compressors not necessary for the description of the present invention have not been shown or discussed.

Figure 1:
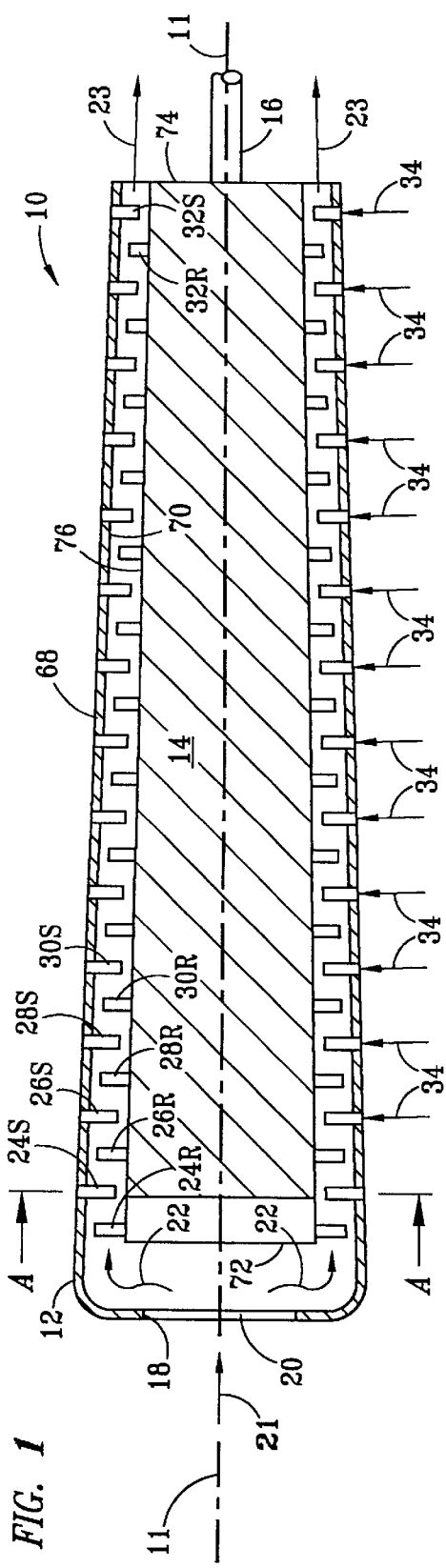
FIG. 1 is a cross sectional view of a multi-stage axial compressor.

In FIG. 1 an axial compressor 10 having a central axis 11 is shown. Compressor 10 comprises an outer housing 12 having an outside 68 and an inside 70. A rotor 14 is coaxially positioned inside outer housing 12 for rotation and includes an outside 76. Rotor 14 as shown is rotatably driven by a shaft 16 which may be coupled to any convenient power source. Outer casing 12 fiber includes an inlet 18, which is typically covered by a screen 20, or the like to prevent the passage of particulate materials into compressor 10. An arrow 21 shows airflow into compressor 10 with air flow inside compressor 10 to compression being shown by arrows 22. Compressor 10 includes a plurality of rotor blades 24R positioned in a row generally around the outside 76 of rotor 14 to interact with stator blades 24S. The rotor blades rotate as rotor 14 is rotated to drive the gas toward a discharge from compressor 10 as shown by arrows 23. The discharged air can be passed to use in any of a variety of desired applications. In the applications mentioned previously, when the gas is air it may be passed to combination with a combustible gas for combustion to produce a hot gas to drive a turbine or the like.

A plurality of pairs of rotor and stator blades are shown. Rotor and stator combinations 24R and 24S form a stage of compressor 10. Similarly combination 26R and 26S, 28R and 28S, 30R and 30S, and 32R and 32S form stages. Not all of the rotor and stator blades have been numbered. As the gas is driven by the rotor blades, the stator blades tend to maintain relatively smooth flow along the axial length of compressor 10.

As shown by arrows 34, according to the present invention, a cooling liquid is desirably injected into compressor 10 between the stator blades in the rows formed by stators 24S, 26S, 28S, etc. The cooling liquid may be injected into any or all of the stages and it is desirably injected at evenly spaced locations around each of the injected rows of stator blades.

Figure 2:
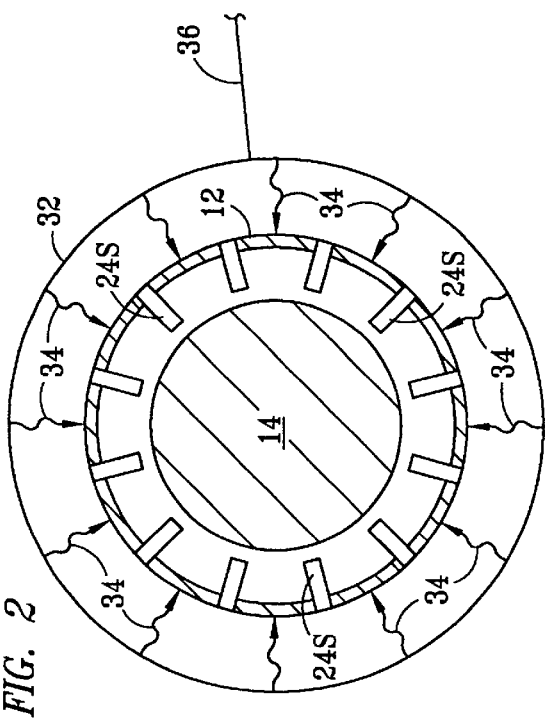
FIG. 2 is a cross sectional end view of the compressor of FIG. 1 taken at line AA.

In FIG. 2, a more detailed showing of the injection system is presented. An end view is taken at the front of the row of stator blades 24S as indicated by line AA. An end view of rotor 14 is shown. For simplicity, rotor 14 has been shown as a solid body whereas in fact it is typically a hollow-membered construction which is of sufficient strength to support the rotor blades and the like. Such details form no part of the present invention. Stator blades 24S are shown with a nozzle feed line 34 extending to the spaces between each pair of stator blades. As shown, lines 34 are flexible hose lines which extend from a manifold tubing 32 to a nozzle assembly 38 (shown in FIG. 3) at each injection site. Nozzle assemblies 38 are supplied with liquid from a feed line 36 through a manifold tubing 32 as will be discussed in greater detail hereinafter.

As noted previously, a cooling liquid may be injected between any or all of the pairs of stator blades, but is preferably injected at evenly spaced locations around each injected row of stator blades. The determination as to whether an injection should be made between a selected number or all of the stator blades is a function of the amount of cooling desired in the particular stage and the like.

Figure 3:
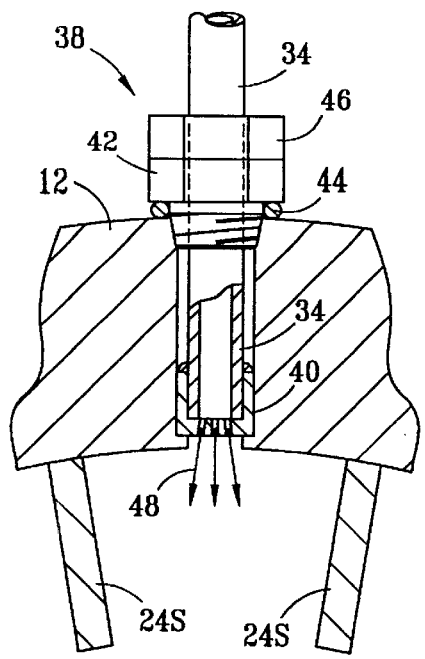
FIG. 3 is a cross sectional view of a nozzle installed through an outer housing of the compressor shown in FIG. 1.

In FIG. 3, a more detailed construction of a nozzle positioned through outer housing 12 is shown. Two stator blades 24S are shown with the nozzle assemble 38 being positioned to inject a mist of a liquid between the two stator blades. Nozzle 40 is designed to be normally recessed a slight distance outside inside 70 of outer housing 12. The nozzle construction details will be discussed subsequently but generally nozzle 40 is formed of a relatively thick walled material which includes a feed line 34 which extends to a junction with manifold tubing 32. While nozzle feed lines 34 have been shown as a tube in FIG. 3, the nozzle feed line upstream from tubular lines 34 may be, and desirably is a flexible hose as known to those skilled in the art for transmitting liquids under high pressure. The flexible hose may in fact extend from line 32 to and be connected to a fitting 42, which is used to sealing position nozzle assembly 38 through outer housing 12. Fitting 42 as shown includes a member which may be screwed into position and includes an O-ring seal 44. Alternatively, fitting 42 could be welded in position or otherwise sealingly retained in position by other mechanical means known to those skilled in the art and sufficient to prevent the leakage of compressed air from inside outer housing 12 around nozzle 40.

Figure 4:
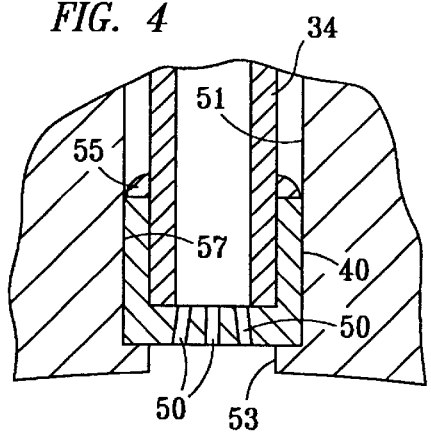
FIG. 4 is a cross sectional view of a nozzle suitable for use in the practice of the present invention; and, FIG. 5 is a schematic diagram of the piping used to inject the selected liquid into the compressor shown in FIG. 1.

Nozzle assembly 38 is shown in greater detail in FIG. 4 and comprises a nozzle 40 which is a heavy walled section which has openings 50 drilled to spray a finely-divided mist from the nozzle in a selected pattern and which is sealingly joined to line 34 by any suitable connection, shown in FIG. 4 as welds 55. The openings 50 are desirably drilled by a laser or other means for producing an extremely small passageway desirably less than about 0.015 inches in diameter. Nozzle assembly 38 is placed in an opening 51 positioned through an outer wall of outer housing 12, sized to closely contain nozzle assembly 38 and having a reduced diameter section 53 smaller than an outer diameter 57 of nozzle 40 at its outlet end into compressor 10. Tubing section 34 is a heavy walled tubing section which extends upwardly to fitting 42 and may extend beyond fitting 42 if desired. As indicated previously, it is desirable that at least a portion of line 34 above fitting 42 comprise a flexible hose for ease of positioning and operation. Nozzle 40 is sized to closely fit in opening 51 and has an outer diameter larger than reduced diameter section 53. Nozzle 40 is fabricated of a heavy walled material and since it is larger in diameter than reduced diameter section 53, it cannot move through reduced diameter section and prevent the entry of my particulates, component parts and the like into compressor 10 via opening 51.

The manifold 32 shown in FIG. 2 may be tubing and maybe positioned around outer shell 12 by any convenient method.

Figure 5:
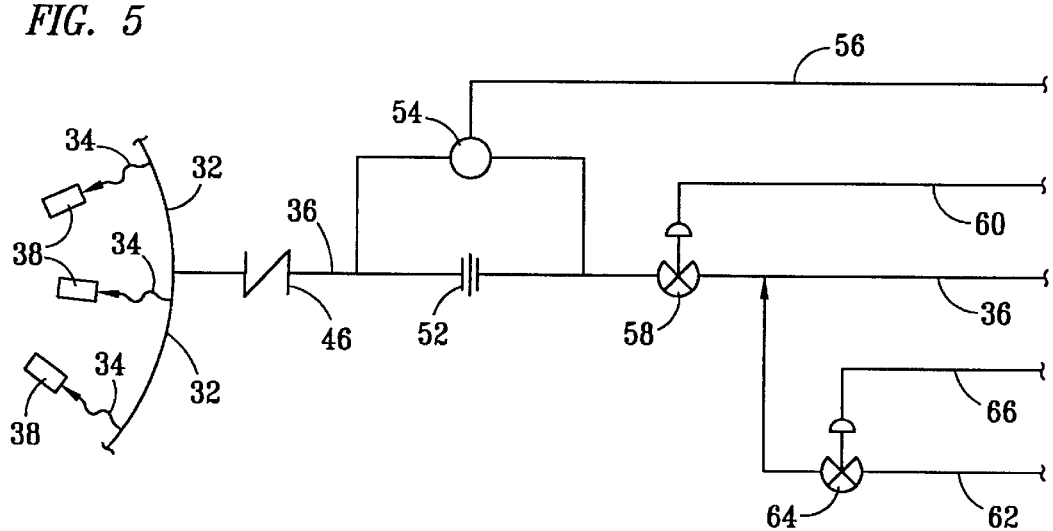

In FIG. 5, a schematic diagram of the flow lines to at least a portion of the nozzles is shown. Line 36, as shown in FIG. 3, includes upstream from line 32 a check valve 46. This check valve is effective to prevent any loss of compressed gas from compressor 10 in the event that there is no flow of liquid into compressor 10 via line 36. Check valve 46 prevents the flow of liquid or gas through line 36 from line 32 and outer shell 12. Upstream from check valve 46 a metering orifice 52 of any suitable design known to those skilled in the art is positioned in line 36. A differential pressure meter 54 is connected to measure the differential pressure across orifice 52 and determine the flow rate through line 36. Differential pressure gauge 54 includes a connection 56 to a computer (not shown) which is used to control the injection into compressor 10 as will be discussed farther. Further upstream from metering orifice 52, a control valve 58 is positioned in line 36. Control valve 58 is activated and regulated by a control connection 60 which may be actuated by a computer signal. The computer functions to regulate the flow of liquid through valve 58 for each stage of injection so that controlled quantities of liquid can be injected into compressor 10 as desired from line 36 through manifold line 12, flexible hoses 14 and nozzle assemblies 58 to control the temperature of the compressed gas flowing through compressor 10. The quantity of finely-divided mist is a fraction of a percent of the total gas flow through the compressor. The additional mass flow as a result of the water addition is so small it can be neglected in calculations of power required to drive the compressor.

Further in FIG. 5, a line 62 is shown for the addition of a cleaning chemical stream to line 36. The flow of liquid through this line is controlled by a control valve 64, which is regulated by a line 66 to a control computer. The control computer acts upon the information collected from lines 56, 60, 66 and other information such as the discharge temperature of the compressed gas, the temperature of the gas in at least a portion of the stages, and the like, to determine the amount of liquid to be charged through each nozzle into each stage. While not shown, temperature sensors may be positioned to detect the temperature in at least a portion of the stages and the like. Further, the gas pressure may be measured in a portion of the stages and the inlet and outlet temperatures from compressor 10 may be measured as well as the outlet pressure.

In general, it is believed that the temperature in an axial compressor of the type shown will be such that any water injected into the compressor after about stage 8 will be completely vaporized into steam immediately. The liquid is injected as a finely-divided mist which may remain as a vaporous mist in the stages at a temperature below the boiling point of water as the air moves along the length of compressor 10 up to stage 8. The air velocity axially along compressor 10 is difficult to determine but is estimated to be from about 500 to about 550 feet per second during normal operation. Accordingly, the average air residence time in compressor 10 is a small fraction of one second. As a result, the finely-divided mist is present in a highly turbulent air stream and is probably at least partly vaporized as it moves through the stages prior to stages which operate at a temperature above the boiling point of water. As a result of the injection of the liquid, which is desirably water when air is the compressed gas, the temperature of the air is reduced in each stage by a small amount with the net result that the amount of work to compress the gas to the desired pressure is reduced. If the liquid is injected into the stages near the compressor discharge it may be necessary to pre-heat the liquid prior to injection to avoid thermal shock to the equipment. Not only is the amount of work required reduced, but also as a result of the reduction of temperature a larger mass of compressed gas can be produced from a compressor of a given size at a desired pressure. As well known to those skilled in the art, the temperature and density of the air increase rapidly as the gas is compressed. Since the increased temperature makes it more difficult to compress the gas, the cooling of the gas in at least a portion of the stages results in the production of a given mass of compressed gas at a given pressure at a lower temperature. Accordingly, the efficiency of compression is increased by the use of the progressive injection of the cooling liquid along the length of axial compressor 10.

Similarly, it is known that fouling of the blades in axial compressors is very detrimental to the efficiency of the compression operation. Accordingly, considerable effort has been devoted to determining how contaminants may be removed from the blades in axial and other compressors. In the article "Gas Turbine Compressor Washing State of the Art-Field Experiences," by Jean Pierre Stadler, referred to previously, it is recognized that pollution on the compressor blades is very detrimental to compressor operations. It appears from the article that the disclosed attempts to remove the pollution injected cleaning solutions only into the inlet gas.

Not only have attempts been made previously to clean pollution from the injector blades by injecting cleaning materials with the inlet gas, but attempts have also been made to improve compressor efficiency by cooling the inlet gas charged to the compressor. One attempt to achieve such cooling is the use of water spray mists, which are discharged into the inlet gas. The use of cooling mists in this fashion does not cool the compressor over any substantial portion of its length. The net result is simply an addition to the humidity of the gas at the inlet with little effect on the discharge temperature of the gas. By contrast, the use of the present invention to inject a cooling liquid along the length of compressor 10 results in a substantial reduction in the amount of work required to compress the gas.

Having thus described the invention by reference to certain of its preferred embodiments, it is respectfully pointed out that the embodiments described are illustrative rather than limiting in nature and that many variations and modifications are possible within the scope of the present invention. Many such variations and modifications may be considered obvious and desirable to those skilled in the art based upon a review of the foregoing description of preferred embodiments.

I claim:

1. A multi-stage axial gas compressor, comprising:
   an outer housing having an inside surface and an outside surface, an inlet and an outlet, and supporting on the inside surface a plurality of rows of stator blades arranged around the inside surface of the outer housing;
   a rotor rotatably positioned inside the outer housing having an outside, a first end near the inlet of the outer housing and a second end near the outlet of the outer housing and a plurality of rows of rotor blades arranged around the outside of the rotor, each row of rotor blades taken with a succeeding row of stator blades forming a single compressor stage; and,
   a plurality of injection nozzles positioned to inject a selected quantity of a finely-divided mist of a selected liquid into the multi-stage axial compressor at a plurality of locations between pairs of stator blades.

2. The compressor of claim 1 wherein at least one mist injection nozzle is positioned to inject a finely-divided mist of a selected liquid into the compressor between at least one pair of the stator blades in each of a plurality of rows of stator blades.

3. The compressor of claim 2 wherein a plurality of mist injection nozzles are positioned to inject a finely-divided mist of a selected liquid into the compressor at a plurality of locations between pairs of the stator blades in a plurality of rows of stator blades.

4. The compressor of claim 1 wherein at least a portion of the injection nozzles comprise an injection nozzle outlet positioned to inject a finely-divided mist into the compressor and a nozzle feed line, the injection nozzle being in fluid communication with a source of high pressure liquid outside the outer housing via the nozzle feed line.

5. The compressor of claim 4 wherein the nozzle feed line includes a check valve.

6. The compressor of claim 4 wherein at least portion of the nozzle feed line comprises a flexible hose.

7. The compressor of claim 4 wherein the nozzle feed line includes a flow measuring device and a flow-regulating valve.

8. The compressor of claim 7 wherein the compressor includes a computer in operative communication with at least one of the flow measuring devices and the flow regulating valve to control the quantity and injection location of the injected liquid.

9. The compressor of claim 4 wherein the compressor includes a source of a cleaning chemical and a chemical feed line in fluid communication with at least a portion of the nozzle feed lines to enable the injection of at least one cleaning chemical into the compressor with the finely-divided mist.

10. A method for increasing the capacity of a multi-stage axial gas compressor having an outer housing having an inside surface and an outside surface, an inlet and an outlet, a rotor being positioned inside the outer housing, the rotor having an outside surface, the method comprising the steps of:

arranging a plurality of rows of stator blades around the inside surface of the outer housing;

arranging a plurality of rotor blades around the outside surface of the rotor such that each row of rotor blades taken with a succeeding row of stator blades form a single compressor stage;

positioning a plurality of injection nozzles to inject a selected quantity of a finely divided mist of a selected liquid into the compressor at a plurality of locations between pairs of stator blades.

11. The method of claim 10 wherein the injected liquid is water.

12. The method of claim 11 wherein the water is injected into at least a portion of the stages in the compressor in an mount sufficient to reduce the temperature of a compressed gas stream discharged from the compressor to a selected temperature.

13. The method of claim 11 further comprising the step of:

injecting a second liquid containing a cleaning chemical into the compressor to clean at least a portion of the stator blades and at least a portion of the rotor blades.

14. The method of claim 13 wherein the cleaning chemical is injected into at least one of the first three stages.

* * * * *